US009219986B2

(12) United States Patent
Pandey et al.

(10) Patent No.: US 9,219,986 B2
(45) Date of Patent: Dec. 22, 2015

(54) CLIENT DEVICE LOCATION USING SYNCHRONIZED WIRELESS RECEIVERS

(71) Applicant: Cisco Technology, Inc., San Jose, CA (US)

(72) Inventors: Santosh Pandey, Newark, CA (US); Brian D. Hart, Sunnyvale, CA (US); Shaunak Joshi, Mountain View, CA (US); David Kloper, Santa Clara, CA (US); Donald R. Peoples, Carrollton, TX (US)

(73) Assignee: Cisco Technology, Inc., San Jose, CA (US)

( * ) Notice: Subject to any disclaimer, the term of this patent is extended or adjusted under 35 U.S.C. 154(b) by 12 days.

(21) Appl. No.: 14/258,104

(22) Filed: Apr. 22, 2014

(65) Prior Publication Data
US 2015/0304814 A1 Oct. 22, 2015

(51) Int. Cl.
*H04W 4/00* (2009.01)
*H04W 4/02* (2009.01)
*H04W 56/00* (2009.01)
*H04W 88/02* (2009.01)

(52) U.S. Cl.
CPC ............ *H04W 4/023* (2013.01); *H04W 56/001* (2013.01); *H04W 88/02* (2013.01)

(58) Field of Classification Search
CPC .... H04W 16/14; H04W 36/06; H04W 72/085
USPC .......... 455/434, 456.1, 457, 404.2, 450, 464; 370/235, 254, 329, 335, 342
See application file for complete search history.

(56) References Cited

U.S. PATENT DOCUMENTS

| | | | |
|---|---|---|---|
| 6,865,185 B1 | 3/2005 | Patel et al. | |
| 7,031,266 B1 | 4/2006 | Patel et al. | |
| 7,362,740 B2 * | 4/2008 | Fredriksson | 370/345 |
| 7,397,779 B2 | 7/2008 | Chandra et al. | |
| 7,529,218 B2 | 5/2009 | Lyons et al. | |
| 7,602,746 B2 | 10/2009 | Calhoun et al. | |
| 7,616,555 B2 | 11/2009 | Hart | |
| 7,657,262 B2 | 2/2010 | Grayson | |
| 7,684,355 B2 | 3/2010 | Meier et al. | |
| 7,826,463 B2 | 11/2010 | Patel et al. | |
| 7,936,681 B2 | 5/2011 | Gong et al. | |
| 7,944,886 B2 | 5/2011 | Stephenson et al. | |
| 2005/0060319 A1 | 3/2005 | Douglas et al. | |

(Continued)

OTHER PUBLICATIONS

Allawi, et al., "Advanced Handoff Mechanism for Delay Sensitive Applications in IEEE 802.11 Wireless LAN," Feb. 17-20, 2008.

(Continued)

*Primary Examiner* — Inder Mehra
(74) *Attorney, Agent, or Firm* — Edell, Shapiro & Finnan, LLC (57) ABSTRACT

A wireless receiver (e.g., access point (AP)) is a member of a group of a plurality of receivers in a wireless local area network and time synchronized with other receivers in the group. A channel scan list is generated from a plurality of wireless channels available in one or more frequency bands. A channel is selected for the receiver to monitor from the channel scan list based on a current time at the receiver such that each of the plurality of receivers in the group are scanning the same channel at the same time. The selected channel is scanned and signal characteristic information (e.g., received signal strength (RSS)) is generated for the signals received during a given scan duration.

25 Claims, 8 Drawing Sheets (56) References Cited

U.S. PATENT DOCUMENTS

| 2006/0270411 | A1 | 11/2006 | Grayson |
| 2007/0258393 | A1 | 11/2007 | Cam-Winget et al. |
| 2008/0146230 | A1 | 6/2008 | Pandian et al. |
| 2008/0293405 | A1 | 11/2008 | Meyer |
| 2009/0286534 | A1 | 11/2009 | Garg et al. |
| 2010/0118830 | A1 | 5/2010 | Stephenson et al. |
| 2011/0002295 | A1 | 1/2011 | Ghosal et al. |
| 2012/0056786 | A1 | 3/2012 | Pandey et al. |

OTHER PUBLICATIONS

Bahl, et al., Microsoft Research, "RADAR: An In-Building RF-based User Location and Tracking System," IEEE INFOCOM 2000, pp. 775-784.
Brik, et al., "Eliminating handoff latencies in 802.11 WLANs using Multiple Radios: Applications, Experience, and Evaluation," ACM SIGCOMM IMC, Oct. 2005.
Caceres, et al., "Fast and Scalable Handoffs for Wireless Interworks," Proc. of ACM MobiCom '96, Nov. 1996.
Gonzalez, et al., "Understanding individual human mobility patterns," Nature, vol. 453, Jun. 5, 2008, pp. 779-782.
Ghosh, et al., "On Profiling Mobility and Predicting Locations of Campus-wide Wireless Network Users," UB-CSE Technical Report, May 2006.
Kim, et al., "Extracting a mobility model from real user traces," IEEE InfoCom, 2006.
Kim, et al., "Selective Channel Scanning for Fast Handoff in Wireless Lan using Neighbor Graph," The 2004 International Technical Conference on Circuits/Systems, Computers and Communications (ITC-CSCC2004), Hotel Taikanso, Sendai/Matsushima, Jul. 6-8, 2004, pp. 7F2P-29-1 to 7F2P-29-4.
Kleimola, et al., "Latency Issues in Distributed Musical Performance," Helsinki University of Technology, Telecommunications Software and Multimedia Laboratory, T-111.5080 Seminar on Content Creation, Fall 2006: Interactive Digital Theatre, Dec. 20, 2006, pp. 1-14.
Nicholson, et al., "BreadCrumbs: Forecasting Mobile Connectivity," Proceedings of the 14th ACM international Conference on Mobile Computing and Networking, Sep. 14-19, 2008.
Park, et al., "Effects of Network Characteristics on Human Performance in a Collaborative Virtual Environment," Proceedings of the IEEE Virtual Reality, Mar. 13-17, 1999.
Ramani, et al., "SyncScan: Practical Fast Handoff for 802.11 Infrastructure Networks," Proceedings of IEEE Infocom, 2005.
Shin, et al., "Improving the Latency of 802.11 Hand-offs using Neighbor Graphs," MobiSys'04, Jun. 6-9, 2004.
Song, et al., "Predictability of WLAN Mobility and its Effects on Bandwidth Provisioning," Proceedings of INFOCOM, Apr. 2006.
Song, et al., "Evaluating Location Predictors with Extensive Wi-Fi Mobility Data," IEEE INFOCOM, 2004.
Veriwave, "Large-scale Wireless Mobility Testing: Getting a handle on WLAN roaming issues," May 8, 2006.
IEEE, "IEEE Standard for Information technology, Telecommunications and information exchange between systems, Local and metropolitan area networks, Specific requirements, Part 11: Wireless LAN Medium Access Control (MAC) and Physical Layer (PHY) Specifications, Amendment 2: Fast Basic Service Set (BSS) Transition," IEEE Std 802.11r, 2008.
Michaelis, et al., "Comparison of User Mobility Pattern Prediction Algorithms to increase Handover Trigger Accuracy," IEEE Vehicular Technology Conference, May 2006.
Kwon, et al., "Handover prediction strategy for 3G-WLAN overlay networks," Network Operations and Management Symposium, 2008, NOMS 2008.
Pack, et al., "Fast Handoff Scheme based on Mobility Prediction in Public Wireless LAN Systems," IEEE Proceedings Communications, vol. 151, No. 05, pp. 489-495, Oct. 2004.
Issac, et al., "Wireless Mobility Management with Prediction, Delay Reduction and Resource Management in 802.11 Networks," IAENG International Journal of Computer Science, 35:3, Advanced online publication, Aug. 21, 2008.
Ravindranath, et al., "Improving Wireless Network Performance Using Sensor Hints," Proceedings of the 8th USENIX Conference on Networked Systems Design and Implementation, Mar. 30-Apr. 1, 2011, pp. 1-14.

* cited by examiner

CLIENT DEVICE LOCATION USING SYNCHRONIZED WIRELESS RECEIVERS

TECHNICAL FIELD

The present disclosure relates to client device location determination in wireless local area networks.

BACKGROUND

Mobile client device location in IEEE 802.11 (Wi-Fi®) wireless local area networks (WLANs) is one feature in modern networks. Mobile device location may take the form of a location relative to a known location at a given venue. Received signal strength measurements are commonly used as a proxy for distance to a given receiver (access point). Accordingly, a given mobile device location can be determined from the received signal strength, time of flight, time difference of arrival or angle of arrival of signals received at a plurality of access points using established techniques such as Received Signal Strength Indication fingerprinting, trilateration, hyperbolic trilateration, or triangulation.

DESCRIPTION OF EXAMPLE EMBODIMENTS

Overview

According to one embodiment, a wireless receiver (e.g., an AP) that is a member of a group of a plurality of receivers is time synchronized with the receivers in the group, e.g., by way of a time server. The time synchronization technique may permit coarse or accurate time stamping of signals received at each of the receivers in the group in order to facilitate wireless client device location, e.g., by a location unit or server. A channel scan list is generated from a plurality of wireless channels available in one or more frequency bands. The time coincidence of channels scanned by the group of receivers allows the location server to time correlate the signals received from a given client device on its channel at each receiver in the group.

Once the scan list is generated, a channel is selected for the receiver to monitor from the channel scan list based on a current time at the AP such that each of the plurality of receivers in the group are scanning the same channel at the same time. The selected channel is scanned for a scan duration and received signal strength (RSS) or other client location information is generated for signals received over the selected channel and may be forwarded to a location server.

From the perspective of a location server, time-stamped signal measurement data from multiple receivers can be used to locate a given wireless client device within a wireless network service area with improved accuracy.

Example Embodiments

Presented herein are techniques to locate a wireless device within a wireless network. The location may be relative to a known location such as distance and bearing from a given location such as a servicing AP or Cartesian (x, y) coordinates. Received Signal Strength (RSS) measurements are commonly used as a proxy for distance to a given receiver (e.g., a wireless network AP) based on the inverse square law, e.g., distance, d, is proportional to a given transmission's time of flight, $\Delta t$, multiplied by the speed of light, c, i.e., $d = \Delta t \times c$. Accordingly, a given wireless device location can be determined from the RSS measurements received at a plurality of APs using established techniques such as Received Signal Strength Indication (RSSI) fingerprinting, trilateration or hyperbolic trilateration. Bearing may be determined from angle of arrival measurement techniques at each AP. Further, current wireless local area network infrastructures have limited intrinsic knowledge of where a wireless client device is going (direction). In this regard, timely updates of a given wireless client device's location determining parameters obtained from the signal characteristics of signals received by the APs, e.g., RSSI, Angle of Arrival (AoA), time difference of arrival, etc., increase the location accuracy of the client device.

Figure 1:
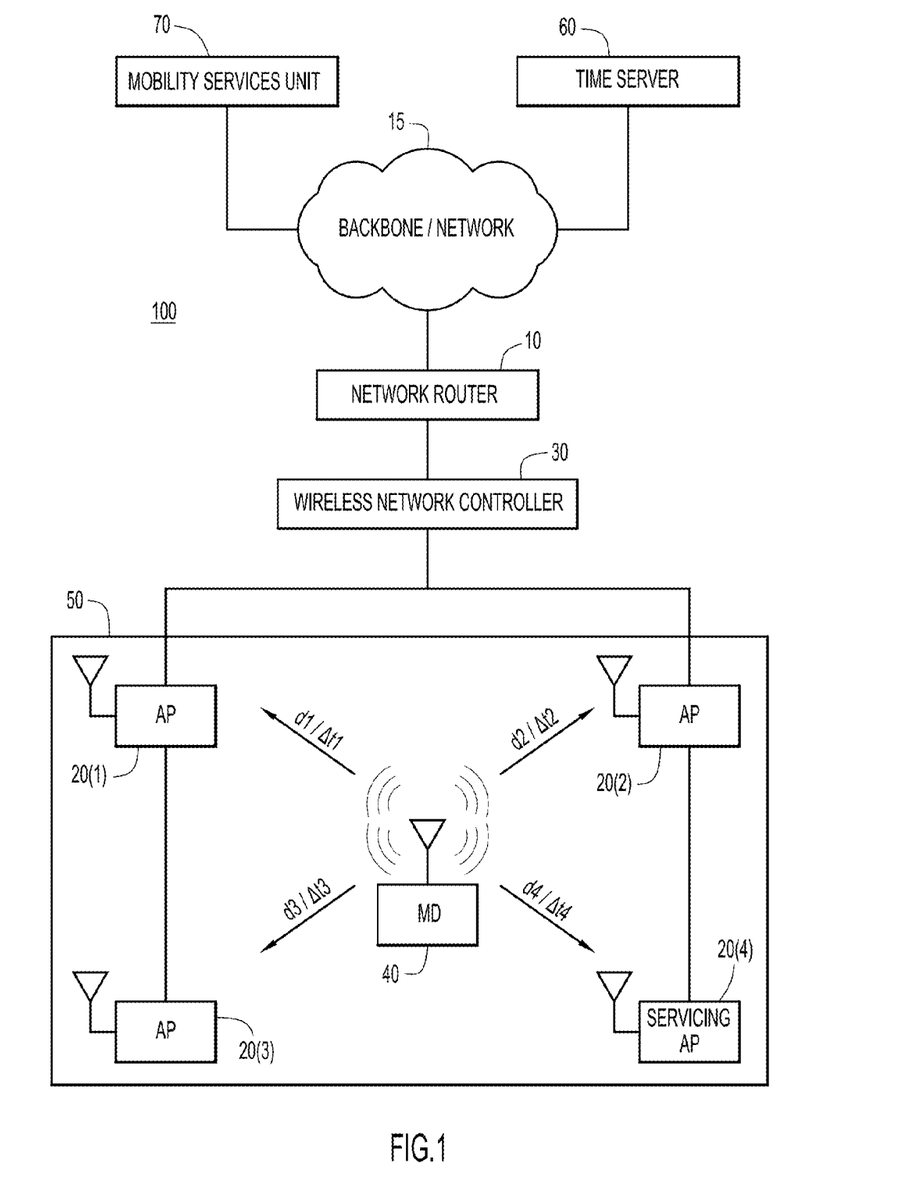
FIG. 1 is an example wireless network environment with a plurality of time synchronized receivers, e.g., wireless access points (APs), configured to forward information, such as received signal strength (RSS) measurements, that can be used to locate a client device according to an example embodiment.

Reference is first made to FIG. 1 that shows a block diagram of a networking environment 100 to which the techniques described herein are applicable. FIG. 1 generally depicts a configuration that is common in many Wi-Fi® wireless local area networks. A network router 10 communicates with a wireless network controller 30 that is further coupled to APs 20(1)-20(4). The APs 20(1)-20(4) provide coverage in a simplified depiction of a coverage area 50, e.g., a building or venue. In turn, APs 20(1)-20(4) service any wireless client devices, also referred to herein as mobile devices (MDs), e.g., MD 40, that may roam within coverage area 50. The MD is also referred to as a station (STA) in IEEE 802.11 parlance. In the description herein, an MD or a STA is a wireless client device that at any instant of time may be mobile or stationary. While FIG. 1 shows only four APs 20(1)-20(4), it should be understood that there may be many more APs in a given wireless network deployment.

Network environment 100 includes a time server 60 and mobility services unit (MSU) 70 coupled to the network router 10 by a backbone or one or more other network(s) 15. Network 15 may also facilitate access to services outside of environment 100 such as access to the Internet or telephony services. The time server 60 provides a time reference service that allows each of the APs 20 to synchronize to the same time reference. For example, the time server 60 may provide a time reference via the Network Time Protocol (NTP) that may be used to synchronize the time of a computer client or server to another server or reference time source, or via the Precision Time Protocol (PTP) that may be used to synchronize clocks throughout a computer network. In turn, the MSU 70 may be configured to compute a location for a given MD, e.g., MD 40, in near real-time based on signal characteristic measurements made by APs 20(1)-20(4) which are forwarded to the MSU 70, e.g., in the form of RSSIs, AoAs, time of arrival, etc.

It should be understood that APs 20(1)-20(4) may include multiple radio transceivers ("radios"). In one example, APs 20(1)-20(4) may be access points in which one or more radios are contained within a single chassis. As described herein, APs 20(1)-20(4) may include at least one Wi-Fi service radio to service MDs and at least one monitoring radio to monitor the channels within a given frequency range and in which the APs(1)-20(4) serve MDs. For example, the service radio may comprise a typical Wi-Fi radio that is ubiquitous in Wi-Fi deployments for exchanging Wi-Fi traffic to/from MDs. The monitor radio may include a module, called a Wireless Security and Spectrum Intelligence (WSSI) module, that can independently monitor the RF environment for denial of service attacks, jamming, or otherwise concurrently provide state-of-the-art security and spectrum analysis functions on all monitored channels, e.g., in both the 2.4 Gigahertz (GHz) and 5 GHz Wi-Fi frequency bands. The components of APs 20 are further described herein in connection with FIG. 2.

It should be noted that APs 20(1)-20(4) need not contain service radios, but may comprise only a monitoring radio or receiver to receive signals from client devices within their respective reception areas. Thus, the APs may be replaced with or supplemented by radio receivers that can receive signals from client devices.

Mobility services unit 70 monitors activity of mobile devices with respect to network environment 100, e.g., by coordinating with wireless network controller 30 and APs 20(1)-20(4) to determine a location of an MD. It should be understood, the APs 20(1)-20(4) embody the functions or methods enabled by the techniques described herein for time synchronization, channel monitoring and signal characteristic reporting. However, some of the techniques may be distributed among network infrastructure devices in network 100, e.g., as software modules or encoded logic.

As briefly mentioned above, the wireless network controller 30 controls delivery of wired network traffic to/from the APs 20(1)-20(4), e.g., the Internet. The wireless network controller 30 may also receive location information of an MD from MSU 70, which may be forwarded to the serving AP, which in turn may send an appropriate over-the-air message to an MD with the AP neighbor list and related information, e.g., to facilitate a transfer or handoff to another AP or for power control.

MSU 70 communicates with the wireless network controller 30 (and with other wireless network controllers associated with other AP deployments). Data representing locations of the APs in a deployment may be stored in the wireless network controller 30 and/or MSU 70, and may be disseminated to each of the APs in the deployment so that each AP knows its own location and the locations of all neighbor APs. In addition, locations of client devices (as they move about) may be determined from computations made by the wireless network controller 30 or the MSU 70 based on RSSI for signals received from client devices at multiple APs in a given deployment. There are numerous techniques now known or hereinafter developed that may be used for location determination of client devices. The MD location may be continuously updated and disseminated to the APs in the deployment.

Although RSSI-based techniques for estimating MD location are widely used, there are issues with current implementations with respect to the reliability of receiving RSSI measurements from MD packets. In some current implementations, the location technique depends on the ability of the MD to send packets (such as probe requests) on different channels. The probe request implementation allows the nearby (non-servicing) APs that are operating on different channels to receive RSSI measurements from the MD to ultimately enable the necessary location calculations. Given the increase of low-latency indoor location applications, the limitations of currently employed RSSI-based techniques have been exposed. There are currently at least two issues that stand out and affect infrastructure-aided MD location using RSSI measurements.

First, due to radio resource management and to reduce co-channel interference, neighboring APs are usually operating on different channels, thereby making it difficult to obtain simultaneous RSSI readings from a given MD on a single channel from multiple APs in a particular area. This limitation reduces the accuracy of a location estimate due to the lack of simultaneous RSSI measurement locations. For example, the possibility of movement of an MD movement between probe requests or channel changes introduces location jitter into the MD location calculations. In other words, the MD may move between RSSI measurements, e.g., the MD may be at location A at measurement time t1, at location B at measurement time t2, and at location C at measurement time t3. Absent the techniques described herein, conventional solutions to any simple geolocation calculation presume that the MD is stationary for the duration of t1 to t3. Since, by default, the MD's motion vector is unknown, motion error is introduced into the location equations. By virtue of the techniques described herein, all RSSI measurement may be obtained at a given time instance, e.g., t1, and across a given monitoring channel by multiple APs at the same time (adjusted for propagation distance). This reduces time error (or eliminates time error if system time is sufficiently accurate), and thereby reduces MD movement uncertainty since the MD has not moved during the measurement of a given MD transmission.

A second issue that affects infrastructure-aided MD location using RSSI measurements is that infrastructure operators and vendors are moving toward a model that reduces the frequency and number of probe packets sent on certain channels in order to preserve the battery life of the MDs. Reducing the frequency of probe packet transmissions from MDs inherently increases the latency in making location estimates and degrades the MD location performance required for many location applications. The reduced frequency of probe packets makes it necessary to monitor data packets. The data packets are only transmitted on the channel on which that MD is operating.

These issues in current implementations described above essentially limit location techniques to single channel monitoring (from among a plurality of channels) and does not consider time and channel synchronization of the APs for the monitoring of all channels, one at a time in rotation, at the same time throughout the monitoring area, e.g., venue or building. The techniques described herein resolve the above limitations by allowing APs to monitor on different channels randomly, yet be synchronized with other APs receiving signals on those same channels at the same time.

Furthermore, the techniques described herein do not rely on the use of probe request packets, but can instead use data packets or any other packets that are associated with the MD to estimate MD location. For example, any packet that contains the MD's Media Access Control (MAC) address may be used in lieu of a probe request. Unlike probe requests, data packets from a given MD are not sent on all channels, but are sent only on the associated channel. Since the data packets from a given MD are not available on all channels, a monitoring receiver is used to selectively monitor the various channels, e.g., using an overlay monitor mode APs or monitor mode Wi-Fi sensors. The monitoring receivers can be stand alone devices or radio modules that can be installed in an AP chassis, e.g., the aforementioned WSSI modules. Example components of an AP with a monitoring radio are further described hereinafter in connection with FIG. 2.

These monitor mode radios in each of a plurality of APs are controlled to observe (receive signals on) the same channel, at the same time, for a sufficient duration in order to receive near-simultaneous signals (propagation time adjusted) from a given MD. When a signal is received at a receiver (monitoring radio or AP), the signal may be time-stamped with the receive time and the corresponding signal characteristic information may be forwarded to the MSU 70 for location computations.

As shown in FIG. 1, MD 40 is making regular data transmissions to its servicing AP 20(4) on its assigned channel. For example, in the United States, Wi-Fi systems operating in the 2.4 GHz band may use channels 1, 6 and 11, and those operating in the 5 GHz band may use channels 36, 40, 44, 48, 52, 56, 60, 64, 149, 153, 157, 161 and 165 (excluding extended channels). The time it takes for the RF signal to travel from MD 40 to AP 20(4) is shown as $\Delta t4$ which is proportional to distance d4 as indicated in FIG. 1. The RF signals from MD 40 can also be received by APs 20(1)-20(3) and take the various distances/times shown in the figure. As mentioned above, the farther away the MD is from a given AP, in general, the weaker the RSS will generally be at that AP.

In traditional systems, APs 20(1)-20(3) may be operating on different channels than AP 20(4) and would not be able to "listen" to data messages from MD 40. However, by virtue of the monitoring radios installed in each AP 20, each AP 20 can monitor data messages from MD 40 in a synchronized fashion. The RSS and time for each data message received by the monitoring radios of the APs 20(1)-20(3) can be forwarded to a location unit, e.g., MSU 70, that is configured to compute the location of MD 40. An example method for synchronized monitoring of data channels for locating MDs is described herein after in connection with FIG. 3, while an example monitoring schedule is described in connection with FIG. 8.

Figure 2:
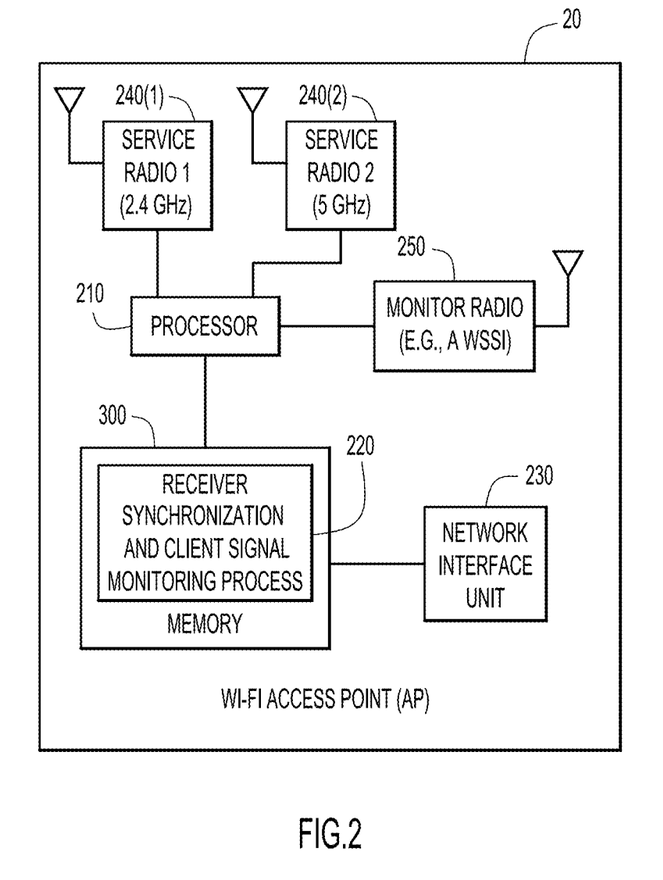
FIG. 2 is an example block diagram of an AP configured to synchronize with other APs in a group and to forward signal measurement information, according to an example embodiment.

Reference is now made to FIG. 2 for a description of a block diagram of an AP configured to participate in the techniques presented herein. AP 20 includes a first radio transceiver or service radio 240(1), a second service radio 240(2), a monitoring radio 250, a control processor (e.g., a microprocessor or microcontroller) 210, a memory 220, and one or more network interface unit(s) 230. Radios 240(1), 240(2) and 250 may each include one antenna or multiple antennas. In one embodiment, the memory 220 stores instructions for an AP synchronization and client signal monitoring process 300. The monitoring radio 250 may be receive-only or may be a radio transceiver. In a dual-channel AP, there are two service radios, i.e., radios 240(1) and 240(2), where one radio, such as radio 240(1), operates in the 2.4 GHz band and another, radio 240(2), operates in the 5 GHz band. For purposes of the embodiments described herein, it should be understood that the APs may be single-channel or dual-channel APs, so long as they have a separately allocated monitoring radio that can be controlled to operate on any channel on which an AP is expected to serve traffic or monitor transmissions from a client device. It should be understood that many other components are included within an AP such as protocol chipsets, baseband processors, modulators, converters and the like. For example, monitor radio 250 may operate in a stand-alone mode, and as such, would incorporate memory and processing logic to execute the pertinent portions of process 300.

Memory 220 may comprise read only memory (ROM), random access memory (RAM), magnetic disk storage media devices, optical storage media devices, flash memory devices, electrical, optical, or other physical/tangible memory storage devices. In general, the memory 220 may comprise one or more tangible (non-transitory) computer readable storage media (e.g., a memory device) encoded with software comprising computer executable instructions and when the software is executed (by the control processor 210) it is operable to perform the operations described herein.

The control processor 210 performs overall control of the AP 20. The control processor 210 in particular executes the AP synchronization and client signal monitoring process 300 stored in memory 220 to perform the AP operations described herein, e.g., in connection with FIGS. 1-6. It should be understood that fixed or programmable logic may be included in AP 20. The network interface unit(s) 230 may permit communication between any of the devices in network environment 100.

Figure 3:
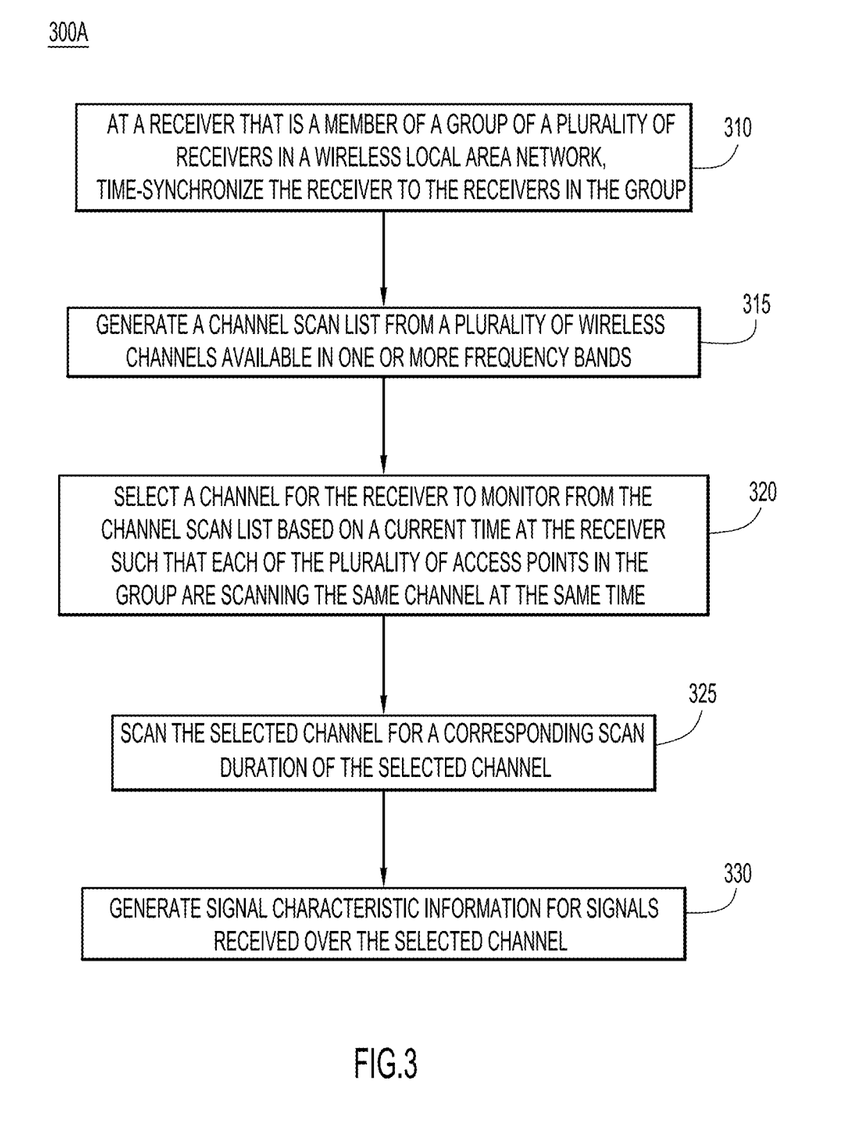
FIG. 3 is a flow chart depicting operations performed by an AP for synchronizing with other APs and forwarding signal measurement information, according to an example embodiment.

Turning now to FIG. 3, the AP synchronization and client signal monitoring process 300 will now be described. Process 300 is described in several functional parts or denoted by reference numerals 300A, 300B and 300C, and described in connection with corresponding FIGS. 3, 5 and 7. Process function 300A relates to a basic receiver synchronization, monitoring and signal characteristic reporting process. Process function 300B pertains to MD "wake-up" and monitoring techniques when a given MD goes into a "sleep" or power saving mode and therefore does not provide timely data messages that may be used to determine the MDs location, or is awake but has no data to send. Process function 300C relates to a filtering process that may be used to determine whether a given received signal belongs to an MD and should be reported upstream, or belongs to another AP, and therefore, can be discarded for the purposes of the techniques described herein. It should be understood that process function 300A can be performed without process functions 300B and 300C, and that process functions 300B and 300C can be performed independently.

Referring to FIG. 3 and process function 300A, at 310, a receiver that is part of a group of receivers in a wireless local area network is time-synchronized with other receivers in the group. The synchronization may be achieved by a common time source available to all receivers and the MSU 70, e.g., as provided by NTP or PTP described above, or by way of another time source, such as that provided by the Global Positioning System (GPS), when available. The receivers may be stand-alone, but are generally described herein as being a module associated with a given AP. At 315, a scan channel list is generated from a plurality of wireless channels available in one or more frequency bands. The channel scan list may be generated using any number of techniques described herein, e.g., the scan list may contain a list of all available channels in a given frequency band. For example, in the Wi-Fi 2.4 GHz band, channels 1, 6 and 11 would be part of the scan list and scanned in a determined order. Moreover, a given channel scan list may include free entries to allow a receiver (AP) to select any channel to monitor.

Each AP follows the same time-channel synchronization, ensuring that each of the APs (monitoring radios of the APs) used in making signal characteristic measurements remain synchronized and scan a given channel at the same time in order to report the signal characteristics, e.g. RSSI, AoA, etc., of packets transmitted by the same MD. These signal characteristic measurements may then be used to obtain an accurate location estimate. In other words, all monitoring radios of APs 20(1)-20(4) as shown in FIG. 1 for example, monitor channel 1 for a scan period, then all APs 20(1)-20(4) switch to channel 6 at approximately the same time for a next scan period, and then followed by channel 11, then back to channel 1, and so on in rotation through an ordered list. Channels in the 5 GHz frequency band may also be included in the channel scan list.

Thus, a plurality of APs form a common synchronized scan group, which may be a group of monitor mode APs/modules in a specific location, site or venue used for RSSI-based or time-based MD location estimation within that site, e.g., APs/modules in a specific building or even a specific floor of a building. All monitor mode APs may be referred to generally as synchronized member entities of a synchronized scanning group, and monitor the same group of channels in a synchronized manner. To summarize, each member entity in the synchronized scanning group will have the same (ordered) channel list from which to scan.

Synchronized scanning allows the APs to change channels at approximately the same fixed interval and at the same fixed time such that location measurements (e.g., time or RSS measurements) are performed by independent APs on the same channel at the same time. It should be understood that the MD location calculation may depend on the accuracy of the time synchronization, as well as the reliability and accuracy of the RSS or other signal characteristic measurements, which may correlate to an MD-to-AP distance, multipath effects, etc. Accordingly, when conditions are less than optimal, then incorrect or inaccurate estimations of a device location may occur. In some embodiments, the time synchronization may be "loose," e.g., on the order of milliseconds when RSSIs are provided, or "tight," e.g., on the order of microseconds when using time to assist in the location of a given MD.

At 320, a channel is selected for the receiver or AP to monitor from the channel scan list based on a current time at the receiver or AP such that each of the plurality of APs in the group is scanning the same channel at the same time. When all APs are synchronized, each group member can follow the same scanning schedule and minimize the time drift between scanning times across all members in the scanning group. In one example, a dwell time per channel, $T_D$, is defined that is the time spent scanning each channel. In a simplified example, if three channels (e.g., 1, 6 and 11) are scanned, then it may be envisioned that one-third of the scanning time may be spent on each of channels 1, 6 and 11. However, the scan duration for each channel need not be the same or the same for any given channel scan rotation, e.g., operation conditions may allow variations in the scan duration of any given channel for any given scan rotation. The scan duration may include not only the scan time, but the time to transition the monitoring radio, e.g., monitor radio 250 (FIG. 2), from one channel to another.

At 325, the selected channel is scanned for a corresponding scan duration of the selected channel and, at 330, signal characteristic information is generated for signals received on the selected channel during the scan duration.

In summary: 1) APs establish time synchronization with an NTP server or other time reference source; 2) the current time t is established as the AP time (AP time=t (in seconds)); 3) the remaining scan duration for a given dwell time, $T_D$, is t modulus function (mod) $T_D$, until t mod $T_D$ is equal to zero; 4) the selected index from the channel scan list may be selected as the floor function of t divided by $T_D$ mod the number of channels in the channel scan list, e.g., 3 channels; 5) based on operations 3 and 4 above, and given the current time t, the scan request is coupled to the monitoring radio for a duration that is equal to $\{T_D-(t \bmod T_D)\}$ on a channel corresponding to index=$\{floor(t/T_D) \bmod (3)\}$. Briefly, the floor function, e.g., floor $(x)=\lfloor x \rfloor$, is the largest integer not greater than x.

By way of further example, for a given AP, a current time t is equal to 1373397349667 milliseconds (ms) (e.g., the number of ticks of a digital clock), $T_D$ is equal to 250 ms and the channel scan list is equal to $\{1, 6, 11\}$. The current remaining scan duration is equal to $T_D$ minus (t mod $T_D$) or 83 ms, and the current scan channel index is equal to $\{floor (t/T_D) \bmod (3)\}$ or 0. Therefore the current scan channel is equal to 1 (i.e., the first channel in the SCL set as indicated by index 0). If the scan channel index is 1, then the current scan channel is equal to 6 (i.e., the second channel in the channel scan list). Likewise, if the scan channel index is 2, then the current scan channel is equal to 11 (i.e., the last channel in the channel scan list). The same type of channel indexing scheme can be employed with the 5 GHz channel set, e.g., $\{36, 40, 44, 48, 52, 56, 60, 64, 149, 153, 157, 161, 165\}$. If the 2.4 GHz (3 channels) and 5 GHz (13 channels) channel sets are combined, then 16 channels may be scanned by a monitoring radio. If all 16 channels are scanned (e.g., the three channels for 2.4 GHz plus 13 channels for 5 GHz) the time it takes to return to a given channel is equal to ($T_D$×#channels in the channel scan list) or (250 ms×16) which is equal to four seconds.

The above described channel selection technique is a pseudo round robin algorithm. Other algorithms may be employed such as a random hop sequence in which synchronized APs randomly hop to the same monitoring channel at the same time or other predetermined algorithm. In this regard, the scan durations may be varied and the channel scan list need not be monotonic. For example, the scan list may contain repeated values such as $\{1, 1, 6, 11\}$ or $\{1, 6, 1, 11\}$ and can thus be adapted for operation considerations, e.g., the number of clients on a given channel, clients that have been stationary for a period of time, clients known to be sleeping or in a power save mode, to name a few.

It should be noted each data packet transmitted by a MD contains a packet sequence number and based on the data packet sequence number, the MSU 70 can correlate the plurality of signal characteristic measurements received from the plurality of APs in a group with a given MD, and therefore, the location calculation is guaranteed to be performed on the same packet from the multiple APs. Furthermore, when the same data message is used for location calculations, the MSU 70 does not need to compensate for MD power control, e.g., when the MD uses a different transmit power for different data rates.

Figure 4:
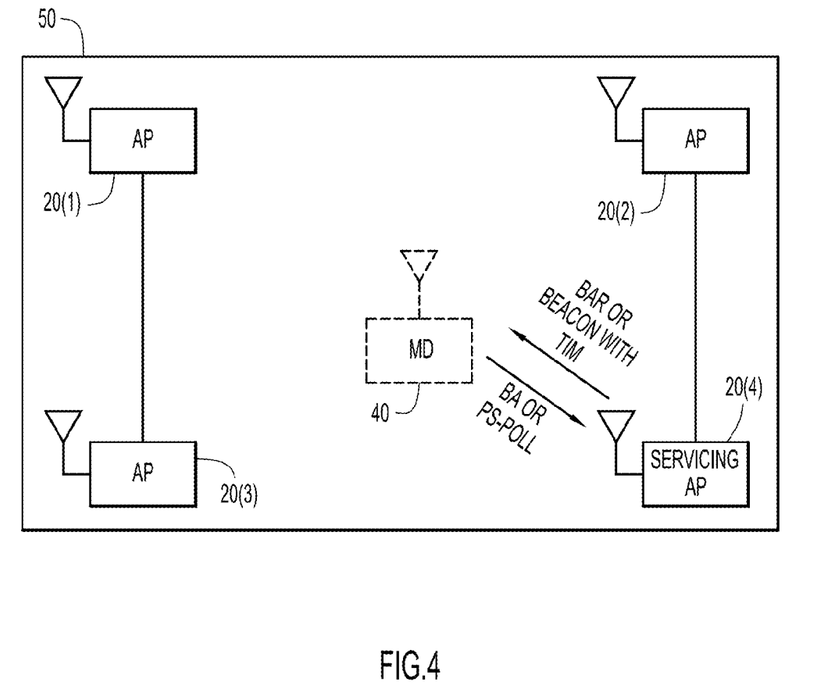
FIG. 4 depicts a venue portion of the example wireless network environment from FIG. 1 in which a servicing AP transmits select messages in order to prompt the client device to make a wireless transmission, according to an example embodiment.

One issue that may arise when employing the techniques described herein is that the MD may not be transmitting any data, and therefore may go into a sleep mode or other power saving mode. This is the situation shown in FIG. 4. FIG. 4 depicts the venue 50 from FIG. 1. In this example, MD 40 has entered a power saving mode as indicated by its dashed lines. Accordingly, after some period of time has lapsed, the APs 20(1)-20(4) will determine that they have not received any data messages from MD 40, thereby creating uncertainty about the location of MD 40. In order to determine the client's location the APs may send a trigger message or frame configured to elicit a response from the client, such as a "ping" request or other message described hereinafter. In accordance with one embodiment, a Block Acknowledgement Request (BAR) may be sent in an attempt to force MD 40 into making a transmission. In some instances, the BAR may not be effective, and in another embodiment, a Beacon with a traffic indication message (TIM) element in may be sent to MD 40. In both of these examples, the use of a BAR or Beacon with a TIM message are not used in the manner and for the purposes described herein. For example, a Beacon with a TIM is used normally used to inform the MD that data are waiting for that MD, but in the embodiment presented herein, the TIM is used to force an MD to wake up whether or not there are data in queue for that MD.

By way of example, the BAR transmit mechanism facilitates low-latency MD location estimation. However, the MDs may not always be transmitting data packets and due to battery power limitations, it is not practical to have the MD constantly sending data (or probe requests) for the purposes of the infrastructure making RSS measurements for location estimation. To mitigate this issue, and while minimizing MD battery drain, each AP group member can periodically send BARs so as to trigger a Block ACK (BA) from a particular MD, which can be used for signal characteristic measurements (e.g., RSS, AoA, etc.). The member APs will work in a synchronized manner by triggering a BAR, e.g., once every channel scan cycle, to a particular MD. The BAR is sent when all the monitoring radios are monitoring the channel on which that MD is operating. Accordingly, each AP in the group has the opportunity to receive the Block ACK and therefore perform RSS measurements for the MD's location.

Figure 5:
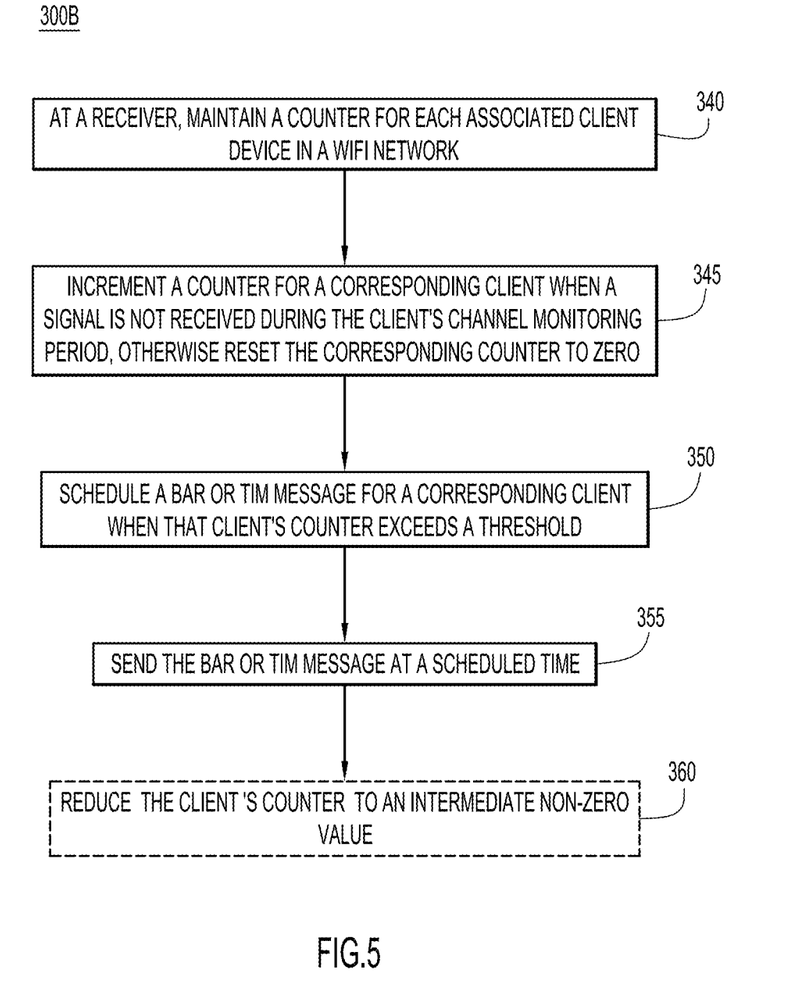
FIG. 5 is a flow chart depicting operations performed by an AP for scheduling messages configured to awaken a client device when the client device is in a power saving mode, according to an example embodiment.

The use of BARs and Beacons with TIMs are now described in connection with FIG. 5. At 340, a serving AP maintains a counter for each associated client device in a wireless network, e.g. a Wi-Fi network. For example, AP 20(4) would maintain a counter for MD 40, but APs 20(1)-20(3) would not. The counter may count the number of scan cycles through the channel scan list. In the case of 16 channels in a channel scan list, each scan cycle would last four seconds. Thus, a timing threshold may be determined based on a count of a number of scan cycles during which signal characteristic information associated with the particular wireless device has not been generated. At 345, a counter for a corresponding client is incremented when a signal is not received during the channel monitoring period for that client, otherwise reset the corresponding counter to zero. In one example, when the monitoring radio of an associated AP, e.g. AP 20(4), is scheduled to monitor an associated client's assigned channel, e.g., the channel on which MD 40 is operating, and the monitoring radio does not receive a data message from that client, then the counter for that client is incremented. If a data message is received, then the counter is reset to zero. Once the need to stimulate traffic from a client has been determined by the client counter reaching its time threshold, the determination whether to send a BAR or Beacon with a TIM is made based on the client's sleep state. If the client is merely idle but not sleeping, a BAR is sent. However, if the client is sleeping, it would not hear a BAR, so a Beacon with a TIM element for the MD is placed in the subsequent beacons. When the client awakes to hear the beacon, the client will send a packet (e.g., a Power Saving (PS)-Poll frame) to get its expected data.

At 350, a BAR or Beacon with a TIM message element is scheduled with the servicing AP for a corresponding client when that client's counter exceeds a threshold, e.g., a counter threshold. If the threshold is monitored by a stand-alone receiver, the receiver sends a message to schedule the BAR or TIM message. When the counter exceeds the threshold, it is assumed that the client's packet statistics and/or location are stale. When a dual-band AP is deployed, there are two serving channels per AP, one in the 2.4 GHz band and one in the 5 GHz band. Therefore, for every cycle of the channel scan list the dual-band AP may send as many as two BARs (once per radio). But no BARs or TIMs are sent to an MD until its associated counter has reached the threshold. This scheduling mechanism prevents the client from sending unnecessary data packets when the channel being monitored is different from its associated channel.

Figure 8:
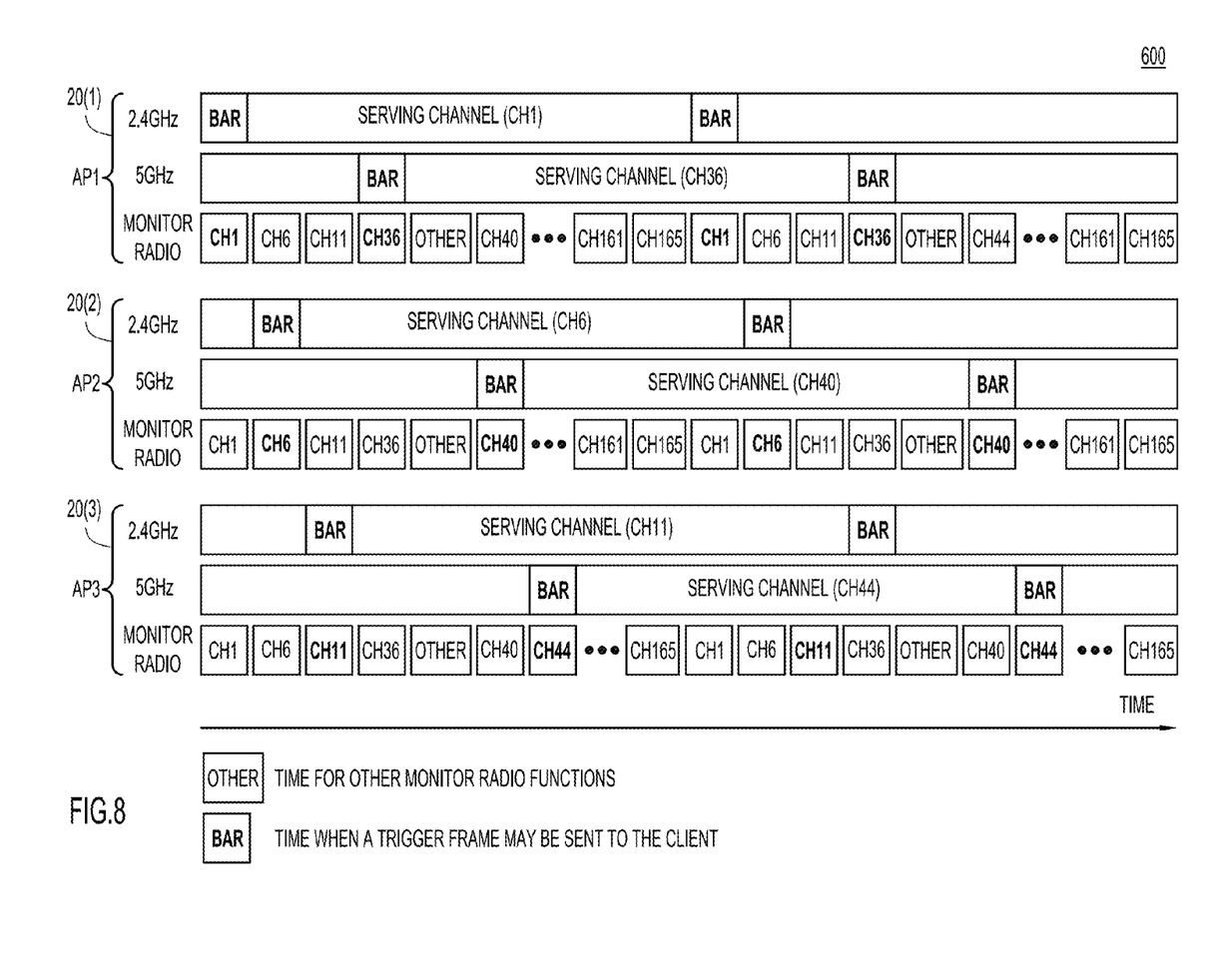
FIG. 8 is an example timing diagram for a plurality of APs serving different channels in the 2.4 GHz and 5 GHz bands, and for operations of a scanning radio in each AP, according to an example embodiment.

In one example, the default threshold value could be set to 10, which is about 40 seconds. The BAR may be scheduled during an off-channel scan. At 355, the BAR or Beacon with TIM is sent, e.g., at a fixed delay from the start of the scan of that channel to allow for any inaccuracy in the channel scan synchronization between APs. Optionally, at 360, the counter threshold may be set to an intermediate reset (non-zero) value once the BAR or Beacon with TIM has been scheduled or sent. For example, the counter threshold could be set to a value of 6 or 8, e.g., as a counter reset value used as a throttling mechanism for unresponsive clients. In this manner, when the count until the next BAR is less than the original trigger threshold of 10, faster scheduling of the next BAR or Beacon with TIM occurs should the client remain unresponsive, as the counter is incremented from 6 or 8 as opposed to zero. A sample scheduling diagram for dual-band APs is shown in FIG. 8 and described hereinafter.

Figure 6:
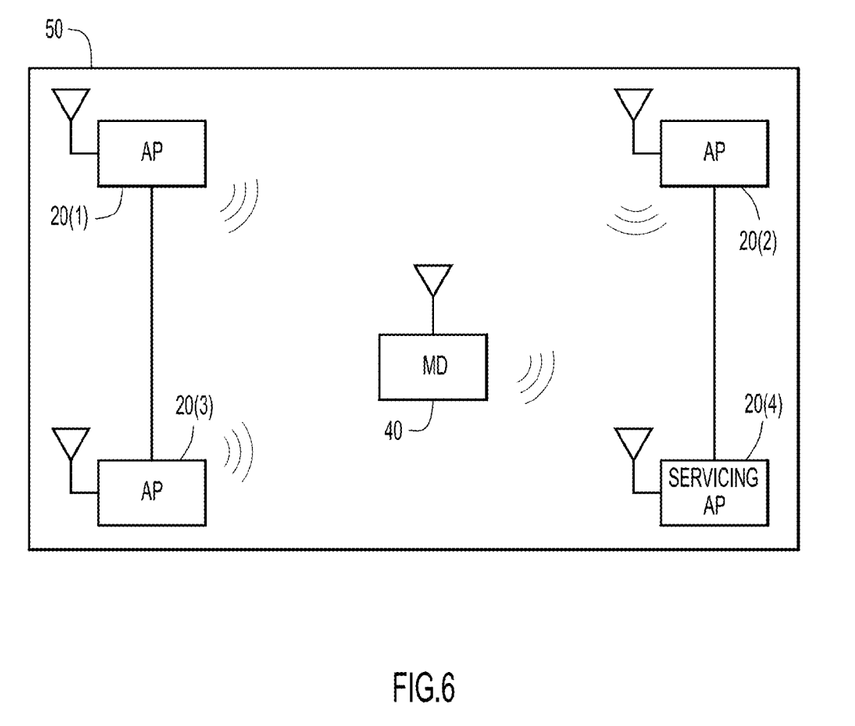
FIG. 6 depicts a venue portion of the example wireless network environment from FIG. 1 in which a servicing AP receives transmission and forwards signal measurement information from both a client device and other APs that have been misclassified as client devices, according to an example embodiment.

Another issue that may arise when the techniques described herein are employed is that for some initial period of time other APs in the system may be misclassified as clients and their RSSIs are reported upstream to the location unit, e.g., MSU 70. This scenario is depicted in FIG. 6. In this example, MD 40 and APs 20(1)-20(3) (as well as other APs that are not shown) are sending data packets that can be received by AP 20(4). Since data packet RSSIs are reported up to the MSU, there is a phenomenon that occurs wherein some AP data packet sources may be initially classified and reported as originating from clients. This occurs for all packets that the member entity receives that are not Beacons. Beacons, however, can be used to reduce unnecessary signal characteristic measurement reporting.

Figure 7:
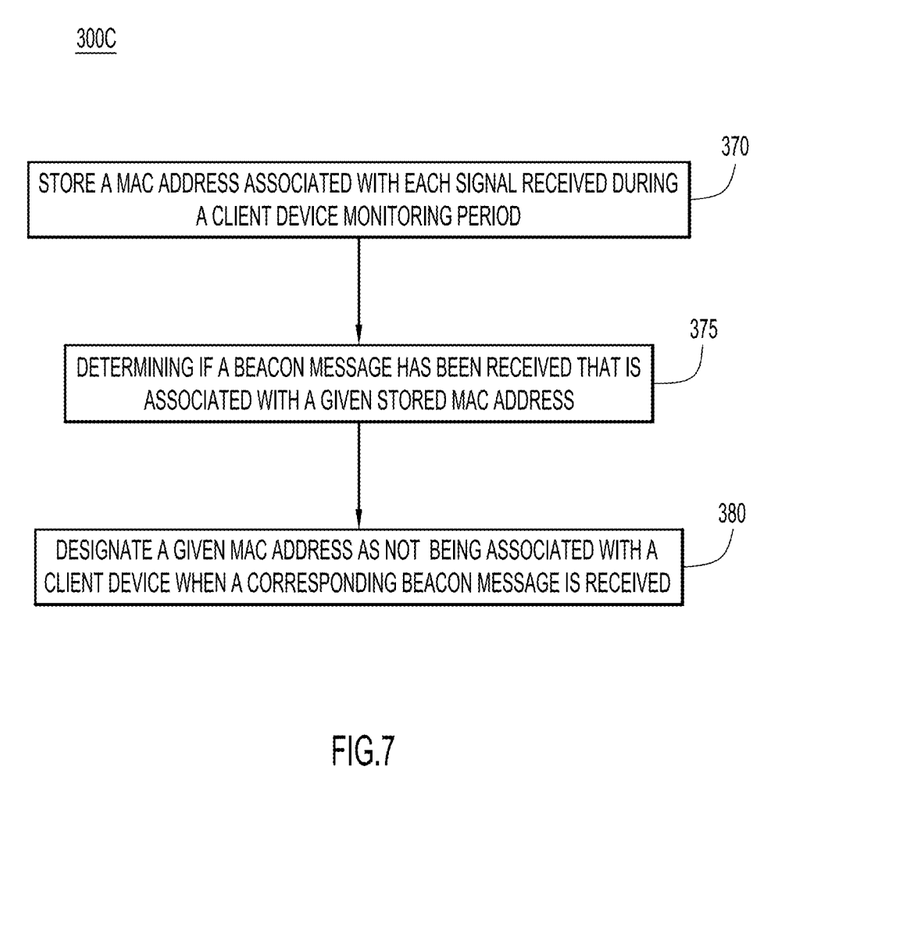
FIG. 7 is a flow chart depicting operations performed by an AP to reduce a number of signal measurement messages when an AP has been misclassified as a client device, according to an example embodiment.

The use of Beacons to differentiate between AP and client data packets is further described in connection with FIG. 7. At 370, a Media Access Control (MAC) address associated with each packet received during a client device monitoring period is stored. In one example, a table is maintained at the member entity, e.g., each AP or monitoring radio in the group. At 375, a determination is made whether a Beacon has been received that is associated with a given stored MAC address. Once a corresponding Beacon is received from a particular MAC address, at 380, the given MAC address is designated as not being associated with a client device. For example, the MAC address may be marked as a packet from an AP and stored in the table, after which all subsequent packets from that source are known to be from an AP by way of designation in the table using the MAC address entry.

The table may be used to record entries along with a receive time-stamp of the last detected packet for that MAC address. If a record in the table has not been refreshed for a period of time, e.g., a default value of 60 seconds, i.e., a packet has not been received from the corresponding source within the last 60 seconds, then that entry is removed and returned to the free list. This aging value of 60 seconds is configurable by the wireless network controller 30 shown in FIG. 1. In other examples, other devices may have also been misclassified as being eligible for signal characteristic monitoring and reporting. For example, rogue devices or devices known or determined to be stationary may be removed from the reporting table.

Turning now to FIG. 8, an example scheduling diagram is shown that may be used to schedule BARs and MD monitoring periods. In this example, scheduling for three dual-band APs is shown, e.g., for APs 20(1)-20(3). The scheduling is shown in three bands from top to bottom for each AP. The bands are for the 2.4 GHz radio, 5 GHz radio and the monitoring radio. AP1 is assigned channel 1 in the 2.4 GHz band and channel 36 in the 5 GHz band. As shown in FIG. 8, each of the monitoring radios cycle from monitoring channel 1 through monitoring channel 16 and are synchronized in time as indicated by the time axis at the bottom of the figure. In other words, all monitoring radios for AP1, AP2 and AP3 are monitoring the same channel at the same time. Also shown for each monitoring radio are periods of time marked "other" as indicated in the legend. These "other" periods of time may be allocated for other functions of the monitoring radio, e.g., for spectrum analysis.

In terms of scheduling BARs, it should be noted that the BARs are scheduled on each AP's servicing channel. For example, in the 2.4 GHz band, AP1 schedules the BAR during its monitoring radio's schedule for channel 1, and in the 5 GHz band, the BAR is scheduled during the monitoring radio's slot for channel 36. The same scheduling logic applies to AP2, for which the 2.4 and 5 GHz band BARs are scheduled during the monitoring radio's schedule for channel 6 and 40, respectively. Similarly, the BARs for AP3 are scheduled during the monitoring radio's schedule for channels 11 and 44, respectively. The scheduling mechanism presented in FIG. 8 is not meant to be limiting and other BAR and monitoring schedules may be employed, e.g., as described above. Regarding the Beacon with TIM elements, these are also transmitted by the associated AP.

There are numerous advantages to the techniques for synchronized client monitoring and location computation. First, as compared to other location methods, the techniques described herein provide both faster and more accurate location updates since all relevant APs report the RSS measurements needed for location computation. Second, the techniques described herein reduce client power consumption by not requiring probe request messages. Third, the time synchronization between APs does not need to be exact and acceptable operation is achieved with synchronization error of ±10 millisecond. This time synchronization has been verified by simulations and lab equipment with six APs cooperating for client location services. Further, the location determination can be triggered by an application on a device, e.g., by sending a ping rather than a lower level MAC driver that sends probe requests or S60 packets. Due to AP synchronization, the associated AP can trigger a request-response exchange from the client at appropriate time to enable application based message triggers.

In summary, techniques are provided herein for a wireless receiver (e.g., an AP) that is a member of a group of a plurality of receivers (e.g., APs in a wireless local area network (WLAN)) to time synchronize with the receivers in the group, e.g., by way of a time reference server. The time synchronization permits the accurate time stamping of signals received at each of the receivers in the group in order to facilitate wireless client device location, e.g., by a location unit or server. A channel scan list is generated from a plurality of wireless channels available in one or more frequency bands. The time coincidence of channels scanned by the group of receivers allows a location server to time correlate the signals received from a given client device on its channel at each receiver in the group.

Once the scan list is generated, a channel is selected for the receiver to monitor from the channel scan list based on the scan duration and a current time at the AP such that each of the plurality of receivers in the group are scanning the same channel at the same time. The selected channel is scanned for a scan duration and received signal strength (RSS) information is generated for signals received over the selected channel and may be forwarded to a location server.

It is also possible to have channel scan lists that vary between receivers (APs) based on hardware capabilities or configuration, and for scan durations that are not of a fixed interval, provided that some prearranged mechanism allows for the deterministic selection of common channels using overlapping time durations. Accordingly, a fixed scan ordering may be used for a subset of the channel scan list requiring synchronization, or the techniques may use some a Pseudo-Random Number Generator (PRNG) to order the channels, e.g., as used in a Bluetooth Piconet's Hop sequence. In one example, a scan list for a first receiver may be {1, x, 6, y, 11} and the scan list for another receiver in a group may be {1, x', 6, y', 11}, where x, x', y and y' are variables that can contain different channels, yet channels, 1, 6 and 11 remain common to both the first and second receivers in the group such that both receivers can monitor those channels at the same time based on the channel selection mechanisms described above.

Thus, to again summarize, it should be understood that some receivers or APs need not be synchronized to other receivers, or be part of a group. These receivers may have different capabilities from one another, e.g., single band or dual-band, range, etc. As such, these receivers can have different channel scan list or scan channels in a different order with differing or varying scan durations.

Thus, to summarize, a method is provided comprising: at a receiver that is a member of a group of a plurality of receivers, time synchronizing the receiver to the other receivers in the group using a common time reference; generating a channel scan list from a plurality of wireless channels available in one or more frequency bands; selecting a channel for the receiver to monitor from the channel scan list based on a current time at the receiver such that each of the plurality of receivers in the group are scanning the same channel at the same time; scanning the selected channel for a corresponding scan duration of the selected channel; and generating signal characteristic information for signals received in the selected channel.

In addition, a system is provided comprising a plurality of receivers, wherein at least two the receivers are members of a monitoring group, wherein each receiver in the monitoring group is configured to: time synchronize to the other receivers in the monitoring group using a common time reference; generate a channel scan list from a plurality of wireless channels available in one or more frequency bands; select a channel to monitor from the channel scan list based on a current time at such that each of the receivers in the monitoring group scan the same channel at the same time; scan the selected channel for a corresponding scan duration of the selected channel; and generate signal characteristic information for signals received over the selected channel.

Further still, an apparatus is provided comprising: a network interface unit configured to send and receive communications over a network; a receiver that is a member of a group of a plurality of receivers; and a processor configured to: time synchronize the receiver to the other receivers in the group using a common time reference; generate a channel scan list from a plurality of wireless channels available in one or more frequency bands; select a channel for the receiver to monitor from the channel scan list based on a current time such that each of the plurality of receivers in the group are scanning the same channel at the same time; cause the receiver to scan the selected channel for a corresponding scan duration of the selected channel; and generate signal characteristic information for signals received in the selected channel.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
   at a receiver that is a member of a group of a plurality of receivers, time synchronizing the receiver to the other receivers in the group using a common time reference;
   generating a channel scan list from a plurality of wireless channels available in one or more frequency bands;
   selecting a channel for the receiver to monitor from the channel scan list based on a current time at the receiver such that each of the plurality of receivers in the group are scanning the same channel at the same time;
   scanning the selected channel for a corresponding scan duration of the selected channel; and
   generating signal characteristic information for signals received in the selected channel.

2. The method of claim 1, further comprising:
   determining a scan duration for a channel in the channel scan list; and
   during scanning, computing a remaining scan time as a scan duration of the scanned channel less a current time modulus the selected scan duration.

3. The method of claim 2, wherein selecting a channel to monitor from the channel scan list comprises one of: computing a floor function value of the current time divided by the determined scan duration, computing a modulus of the floor function value and the number of channels in the channel scan list, and selecting a channel with a predetermined channel selection algorithm.

4. The method of claim 1, further comprising:
   at the end of each corresponding scan duration, selecting a next channel to scan from the channel scan list;
   scanning the next selected channel for a corresponding scan duration; and
   generating signal characteristic information for signals received over the next selected channel.

5. The method of claim 1, further comprising:
   generating a time-stamp for each generated signal characteristic information; and
   sending the signal characteristic information and corresponding time-stamp to a location services unit configured to determine a location of a wireless device using signal characteristic information associated with the wireless device.

6. The method of claim 1, wherein signal characteristic information for signals received during the monitoring of a selected channel are associated with at least a particular wireless device, and further comprising determining when a time for receiving signal characteristic information associated with the particular wireless device has exceeded a time threshold.

7. The method of claim 6, wherein the receiver is associated with a servicing access point of the particular wireless device, and wherein when the time threshold is exceeded, transmitting a trigger frame from the servicing access point, the trigger frame comprising information configured to cause the particular wireless device to transmit a response when a plurality of receivers in the group are monitoring a particular channel.

8. The method of claim 7, wherein transmitting the trigger frame comprises transmitting one of a Block Acknowledgement Request and a beacon frame that includes a traffic indication message element configured to notify the particular wireless device that traffic is available for it so that the particular wireless device transmits a packet.

9. The method of claim 8, wherein transmitting comprises transmitting the Block Acknowledgement Request to the particular wireless device when the particular wireless device is not in a sleep mode, and transmitting the beacon frame to the particular wireless device when the particular wireless device is in a sleep mode.

10. The method of claim 7, wherein the timing threshold is based on a count of a number of scan cycles during which signal characteristic information associated with the particular wireless device has not been generated, and when the count has exceed the time threshold, scheduling the trigger frame to be transmitted.

11. The method of claim 10, further comprising resetting the count to an intermediate reset count value that is less than the time threshold when the trigger has been sent.

12. The method of claim 1, further comprising:
    accumulating a monitoring list of wireless devices to scan for based on signals received from wireless devices on a selected channel; and
    removing wireless devices from the monitoring list when those wireless devices were previously misidentified as being eligible for signal characteristic monitoring.

13. The method of claim 1, wherein selecting comprises selecting the channel from the channel scan list such that the selected channel and a scan duration used to monitor the selected channel are the same for each of the plurality of receivers in the group.

14. A system comprising:
    a plurality of receivers, wherein at least two of the plurality of receivers are members of a monitoring group, wherein each receiver in the monitoring group is configured to:
      time synchronize to the other receivers in the monitoring group using a common time reference;
      generate a channel scan list from a plurality of wireless channels available in one or more frequency bands;
      select a channel to monitor from the channel scan list based on a current time such that each of the receivers in the monitoring group scans the same channel at the same time;
      scan the selected channel for a corresponding scan duration of the selected channel; and
      generate signal characteristic information for signals received over the selected channel.

15. The system of claim 14, wherein each receiver in the monitoring group is configured to:
    at the end of each corresponding scan duration, select a next channel to scan from the channel scan list;
    scan the next selected channel for a corresponding scan duration; and
    generate signal characteristic information for signals received over the next selected channel.

16. The system of claim 14, wherein a given channel scan list comprises free entries to allow the receiver to select any channel to monitor.

17. The system of claim 14, wherein the scan duration is a fixed period of time or a variable time period from one scan cycle to a next scan cycle.

18. The system of claim 14, wherein each receiver in the monitoring group is configured to select a next channel to monitor from the channel scan list using one of round robin selection, pseudo-random selection and a predetermined channel selection algorithm.

19. The system of claim 14, wherein at least one particular receiver of the plurality of receivers is independent and not a member of the monitoring group, the particular receiver being configured to:
generate a particular channel scan list from the plurality of wireless channels available in one or more frequency bands, wherein the particular channel scan list generated by the particular receiver may be the same or different from the channel scan list employed by the monitoring group;
select a channel to monitor from the particular channel scan list independent from receivers in the monitoring group;
scan the selected channel from the particular channel scan list for a corresponding scan duration of the selected channel from the particular channel scan list; and
generate signal characteristic information for signals received in the selected channel.

20. The system of claim 14, further comprising a server, wherein each of the plurality of receivers is configured to send generated signal characteristic information to the server.

21. An apparatus comprising:
a network interface unit configured to send and receive communications over a network;
a receiver that is a member of a group of a plurality of receivers; and
a processor configured to:
time synchronize the receiver to the other receivers in the group using a common time reference;
generate a channel scan list from a plurality of wireless channels available in one or more frequency bands;
select a channel for the receiver to monitor from the channel scan list based on a current time such that each of the plurality of receivers in the group are scanning the same channel at the same time;
cause the receiver to scan the selected channel for a corresponding scan duration of the selected channel; and
generate signal characteristic information for signals received in the selected channel.

22. The apparatus of claim 21, wherein the processor is further configured to:
at the end of each corresponding scan duration, select a next channel to scan from the channel scan list;
cause the receiver to scan the next selected channel for a corresponding scan duration; and
generate signal characteristic information for signals received over the next selected channel.

23. The apparatus of claim 21, wherein the processor is further configured to:
generate a time-stamp for each generated signal characteristic information; and
send, via the network interface unit, the signal characteristic information and corresponding time-stamp to a server configured to determine a location of a wireless device using signal characteristic information associated with the wireless device.

24. The apparatus of claim 21, wherein the processor is further configured to:
at the end of each corresponding scan duration, select a next channel to scan from the channel scan list;
cause the receiver to scan the next selected channel for a corresponding scan duration; and
generate signal characteristic information for signals received over the next selected channel.

25. The apparatus of claim 21, further comprising a transmitter, wherein signal characteristic information for signals received during the monitoring of a selected channel are associated with at least a particular wireless device, and the processor is further configured to determine when a time for receiving signal characteristic information associated with the particular wireless device has exceeded a time threshold; and when the time threshold is exceeded, the processor is configured to cause the transmitter to transmit a trigger frame comprising information configured to cause the particular wireless device to transmit a response when a plurality of receivers in the group are monitoring a particular channel.

* * * * *